United States Patent [19]

Vanderzanden

[11] Patent Number: 4,987,859
[45] Date of Patent: Jan. 29, 1991

[54] POULTRY FEEDER

[76] Inventor: John Vanderzanden, 158 Dalewood Cresent, Hamilton Ontario, Canada, L8S 4B7

[21] Appl. No.: 463,133

[22] Filed: Jan. 10, 1990

[51] Int. Cl.⁵ ............................................. A01K 39/014
[52] U.S. Cl. .................... 119/57.7; 119/57.2; 119/57
[58] Field of Search ................ 119/57, 57.1, 53, 57.2, 119/57.5, 57.7, 74, 81

[56] References Cited

U.S. PATENT DOCUMENTS

| 2,926,772 | 3/1960 | Reed | 119/57.7 |
| 2,984,338 | 5/1961 | Pockman et al. | 119/57.2 |
| 3,029,791 | 4/1962 | Hacker | 119/57.2 |
| 3,112,732 | 12/1963 | Carson | 119/57.2 |
| 3,511,215 | 5/1970 | Myers | 119/53 |
| 3,585,970 | 6/1971 | Scott | 119/53 |
| 3,827,405 | 8/1974 | Allen | 119/53 |

FOREIGN PATENT DOCUMENTS 1358884 3/1964 France .............................. 119/57.1

Primary Examiner—John G. Weiss
Attorney, Agent, or Firm—McConnell and Fox

[57] ABSTRACT

An improved feeder for a poultry house includes a distributor and trough assembly suspended in a manner that permits height adjustment and inversion for convenient cleaning between batches. The assembly is simple in design permitting assembly from a minimum number of standardized components.

10 Claims, 3 Drawing Sheets

POULTRY FEEDER

FIELD OF THE INVENTION

This invention relates to automatic poultry feeders and in particular to trough type poultry feeders of an improved form.

DESCRIPTION OF THE PRIOR ART

Automatic poultry feeding apparatus is a major advantage in feeding large numbers of birds without significant operator time or attention. The dispersal and quantity of feed provided is determined by the arrangement and control of the system rather than by the operator. In the past it has been common to provide an electrical feed system where the electrical system is controlled in accordance with time or volume, thus a predetermined amount of feed is introduced at certain intervals. Typical of such systems is the system shown in U.S. Pat. No. 3,349,753 issued Oct. 31, 1967 which shows an automatic weight operated feeding device including a plurality of pans, each fed from a common supply with one of the pans attached to a switch mechanism which determines the weight of the pan and determines whether further feed will be provided.

Another typical automatic feeding system is shown in U.S. Pat. No. 2,802,610 issued Aug. 6, 1957. This is a trough type feeder which may be distinguished from the feeder shown in U.S. Pat. No. 3,349,753 in that the feed is distributed longitudinally in a trough. Since the feed is distributed in a trough it is more easily accessible to the poultry than the case of pans as shown in U.S. Pat. No. 3,349,753. The amount of feed provided, however, is determined solely by a timing mechanism.

A further form of automatic feeding device is shown in U.S. Pat. No. 3,476,087. This is another example of a pan type feeder where the feeding device is switched off and on, depending upon the volume of feed at the end of the system furthest from the feed source.

All of the foregoing systems have certain advantages and certain disadvantages. For example, U.S. Pat. No. 2,801,610 is unadjustable with respect to height and is difficult to clean because the whole apparatus is essentially fixed to the floor. The feeder in U.S. Pat. No. 3,476,087 is adjustable in height but, on the other hand, is a pan type feeder which has disadvantages, as previously indicated, in that the number of birds which have convenient access to the feed is less per unit floor area than in the case of a trough type feeder.

It is desirable that an automatic type feeder provide a maximum access to the feed; that the accessability be variable from the point of view of height so that it may be raised as the fowl mature and to control feed accessability; that the quantity of feed distributed be adjustable and that the whole apparatus be conveniently emptied and cleaned between batches of poultry.

SUMMARY OF THE INVENTION

In accordance with the present invention, a trough type feeder is provided which is adjustable in height, is automatically controlled, provides a feed reservoir to ensure that there is little likelihood of total absence of feed at any time during a feed period and is designed to be conveniently emptied and cleaned between batches and at the same time is rugged and capable of withstanding the difficult environment.

These and other advantages are obtained in a manner disclosed in the following description and drawings.

DESCRIPTION OF THE PREFERRED EMBODIMENT

Figure 1:
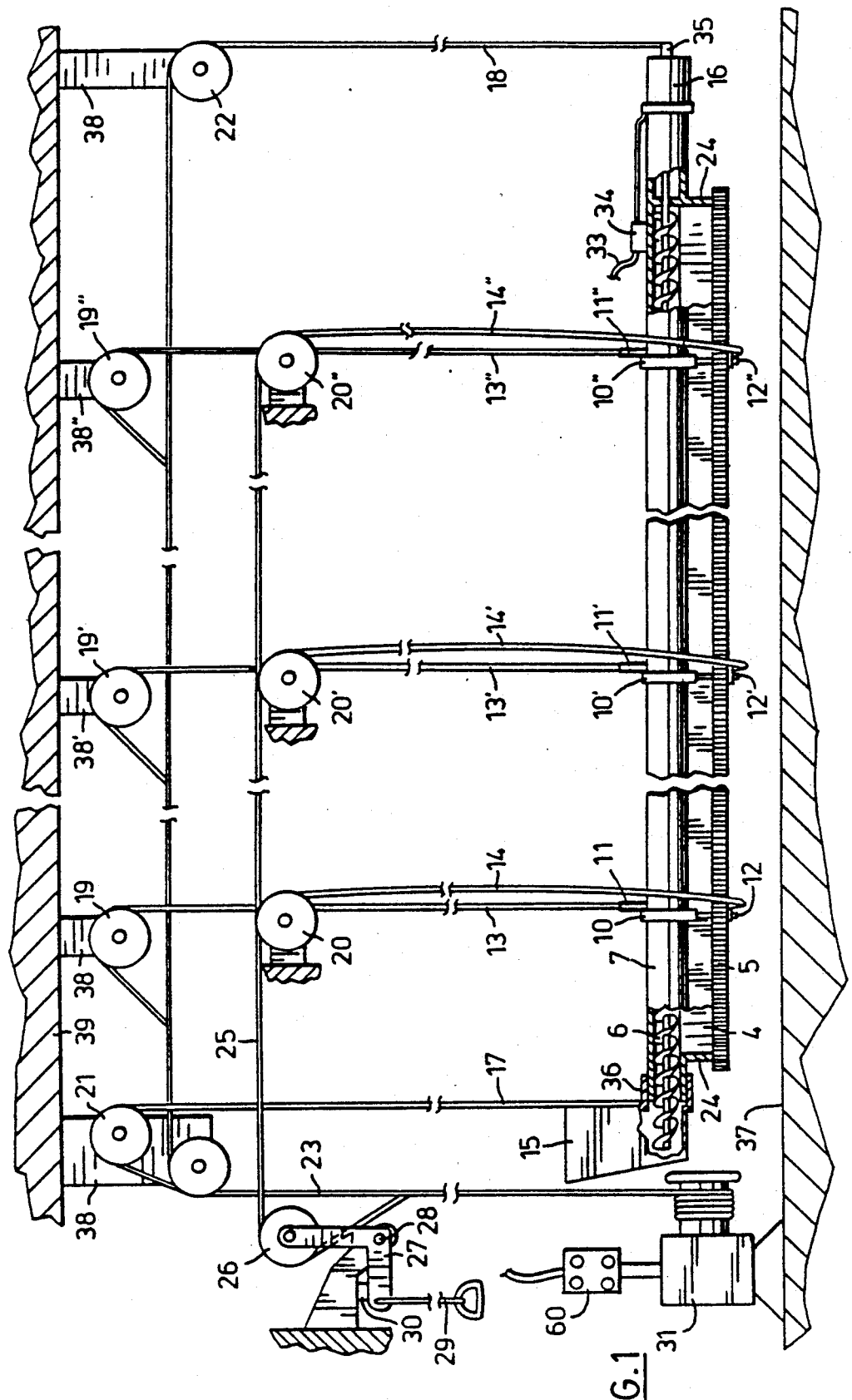
FIG. 1 is a schematic diagram showing the general arrangement of the feeder.

As will be seen in FIG. 1, the feeder consists of a trough assembly 4 including a trough 5 and a feed auger 6. The feed auger 6 is partially surrounded by a tube 7 (shown in greater detail in FIG. 2). The open edge of the tube 7 has two extension side members 8 and 9 which extend downwards and outwards from the enclosure to a location adjacent the trough. End members 24 and 24' close the ends of the chamber formed by members 8 and 9. Tube clamps 10, 10' etc. support the tube with reference to the trough and attached to the clamps at the top and bottom are suspension brackets 11, 11' (or 12 and 12'). Suspension cables 13, 13' etc. are connected to the suspension brackets 11, 11' and rotation cables 14, 14' etc. are connected to the lower brackets 12. The feed augur protrudes into the feed hopper 15 and is driven by the auger drive motor 16. Cable 17 suspends the hopper 15 and a cable 18 suspends the motor 16. The cables 13, 13' etc. pass over sheaves 19, 19' while the rotation cables 14, 14' pass over sheaves 20, 20' etc. The cable from the hopper, that is cable 17, passes over sheave 21. The motor suspension cable passes over sheave 22. Cables 13, 13', after passing over their respective sheaves are joined to a common suspension cable 23, while rotation cables 14, 14' etc., after passing over their respective sheaves are joined to a common rotation cable 25. This cable 25 passes over sheave 26 and is then joined to the common suspension cable 23 which then proceeds down to electric winch 31. Sheave 26 is mounted for rotation on the angle arm 27 which is pivoted at pivot 28. A pullcord 29 is attached to the other leg of angle arm 27 which is prevented from further clockwise rotation by stop 30. Motor 16 is provided with an electrical supply through supply lead 33 which is connected through switch 34 to the motor.

Cable 18, which suspends the motor, is connected to the motor suspension point 35 placed slightly above the centre of gravity of the motor which is mounted by a spigot to tube 7. The other end of tube 7 is supported in a slip fitting 36 which is connected to the wall of the feed hopper 15. The whole assembly is supported above the floor 37, a distance determined by positioning of cable 23. All the sheaves 19, 20, 21 and 22 are supported from an overhead ceiling or beam 39 by sheave supports 38, 38' etc.

Figure 2:
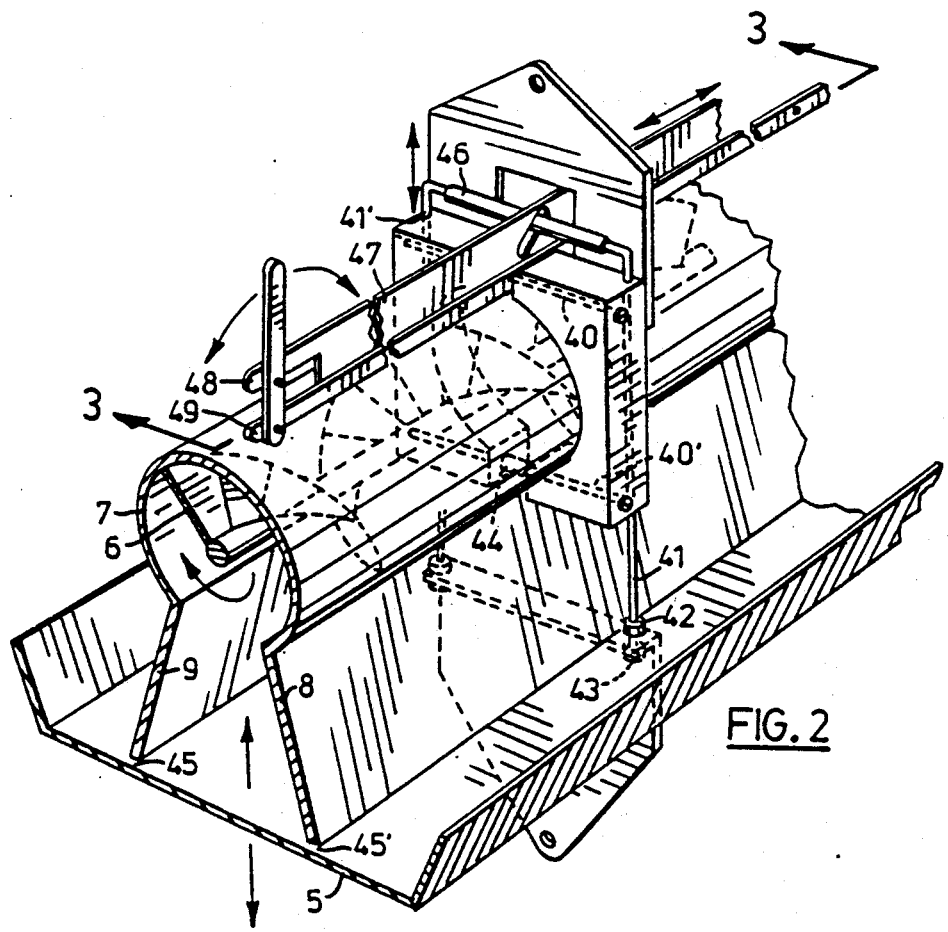
FIG. 2 is a detailed diagram of a portion of the trough, reservoir and auger feed, being a portion of the system shown in FIG. 1.

Further details of the clamp 10 and the arrangement of the trough and auger feed are shown in FIG. 2. It will be seen that the clamp 10 consists of a pair of side members which are clamped around the tube by means of through bolts 40 and 40'Each of the side members has a hole through which a rod 41, 41' passes freely. Each rod is fastened to the trough 5 by means of upper and lower nuts 42 and 43 which are threaded onto the rod above and below the trough and firmly fix the trough to the rods. A spacer 44 on through bolt 40' prevents the tube 7 from being crushed by the clamp.

As will be seen, the spacing of the feed tube and its side members 8 and 9 from the trough provides a feed slot 45 of a dimension determined by the position of rods 41, 41'. The upper ends of the rods are bent over into an L shape and retain a roller 46 which passes through an adjuster mechanism 47. The adjuster mechanism, shown in more detail in FIG. 3, consists of two plates or straps 48 and 49. The fixed plate 49 is mounted on the through bolts 40 of all the clamps which, as may be seen in FIG. 3, passes through a hole 56 in plate 49. The moveable plate 48 has a pair of slots, a first slot 55 which passes around bolt 40 and permits the plate to move longitudinally with reference to the bolt and a sloping slot 54 through which the roller 46 passes. The relative position of the plates 48 and 49 is determined by a lever 50 which is pivotally mounted at 51 and 52 to plates 48 and 49 respectively. Motion of the lever 50 in the direction indicated by arrow 53 moves plate 48 with respect to plate 49 raising and lowering the roller 46 and thus rods 41 and 41'.

In an alternative form the means of adjusting the dimension of the feed slot 45 is a strip 8A mounted on the sidewall such as sidewall 8 by suitable headed studs 58 which pass through slots 59 and are attached to the sidewall. A mechanism similar to that shown in FIG. 3 can be used to move strip 8A longitudinally with respect to sidewall 8 and thus adjust feed slot 45.

OPERATION

After installation in accordance with the diagram of FIG. 1, the feed hopper 15 may be filled and the height of trough 5 adjusted by rotation of winch 31 by its electrical drive control 60. In early stages, the chicks may be so small that the trough has to be placed on the floor and feed placed in a suitable pattern on the floor to train the chicks to go to the trough for food. As the fowl mature, the trough may be raised to ensure that it is necessary for the fowl to reach upward to get their food which improves the efficiency of the system and also minimizes the likelihood of fowl perching on the trough. It also permits fowl to go from one side to the other of the trough, if it is raised to approximately a normal head height. This is very necessary to ensure the proper circulation of the fowl in the floor area.

It will also be noted that the lips of the trough are only sufficiently high to retain the feed and so do not require even small fowl to get into the trough to reach the food. The gap 45 may now be adjusted and will determine the depth of feed in the trough. The greater the gap 45 the greater the depth of the food in the trough. In this way food may be used efficiently to minimize waste and yet ensure that there is always an adequate supply of feed depending on the size of the fowl. Adjustment is made as previously indicated by moving lever 50 in the direction indicated by the arrow to force the roller 46 up or down and thus move rods 41 and 41' and move the trough relative to the feed tube 7 varying the gap 45. If motor 16 is now energized, the feed auger will rotate drawing feed out of the feed hopper 15 and down the tube 7. As it travels down the tube 7 it fills up and space between side members 8 and 9 flowing out through the gap 45 until normal flow rate of the feed determines depth of feed in the trough. The auger continues turning, filling the reservoir formed by the sidewalls 8 and 9, and the end members 61 and 62 until the feed reaches switch 34 having completely filled the reservoir. At this point, the switch 34 is actuated and the supply to the motor is disconnected. As the feed is removed by the fowl, the reservoir empties and switch 34 recloses, motor 16 is energized and the trough is replenished from the feed reservoir until such time as the feed around the switch 34 is removed causing it to reopen and the motor is again de-energized until the food is used.

It will be noted that during adjustment by winch 31, all the cables 13, 14, 18, 23 and 25 are moved equally and the whole trough assembly is moved up and down and adjusted to the desired height together with the motor 16 and the feed hopper 15. The electric drive 60 for winch 31 is extremely useful for establishing feeding patterns. It has been found that controlled feeding produces preferred results, and by means of a suitable well known timing device controlling drive 60, food can be supplied by automatically lowering the feeder for a predetermined period and then raising it for a predetermined period thus withdrawing the food supply. The result is a bird of better condition and less waste food, since any food on the floor is scratched up and used while the feeder is raised out of reach. The automatic supply of food to the trough on the other hand, continues to operate whether or not the trough is raised. It will also be noted that, because the motor 16 is supported at a suspension point slightly above its centre of gravity, the trough will normally be retained in a horizontal position by the weight of the motor and the weight of the trough.

At the end of a poultry cycle when it is intended to remove the birds, motor 16 is de-energized by an overriding switch which eliminates the electrical supply from supply lead 33 and prevents further motion of the auger. Poultry then remove the remnant feed and any feed left in the tube can be forced back into the feed hopper by reversing the motor if necessary. With the system as empty as possible, it is now possible to rotate the trough by pulling on cord 29 which moves the lever arm 27 and thus sheave 26 causing cable 25 to be extended, lifting cables 14, 14' etc. and this motion can be continued until the trough is completely upside down suspended by cables 14, 14'. In this position it is convenient to thoroughly clean the apparatus before the introduction of a new batch of poultry.

Figure 4:
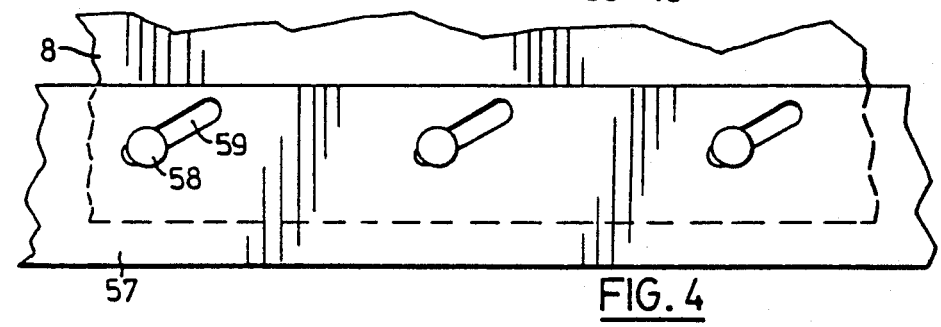
FIG. 4 is an illustration of an alternative feed rate adjustment.

While the feed rate adjuster 47 has been described, it will be understood that the feed slot dimension 45 could also be adjusted by other methods, for example, by the apparatus shown in FIG. 4 where the edges of side member 8 have an extension 8A mounted on them by means of a plurality of studs 60. The studs 60 pass through slots 59 in plate 8A and are fixed into the side member 8. By moving member 8A longitudinally with respect to member 8, its location with respect to member 8 is changed and thereby the gap 45 may be adjusted. The method of moving member 8A and its corresponding member 9A may be similar to that shown for adjuster 47, that is a lever pivotally connected to both members and manually adjustable.

Figure 3:
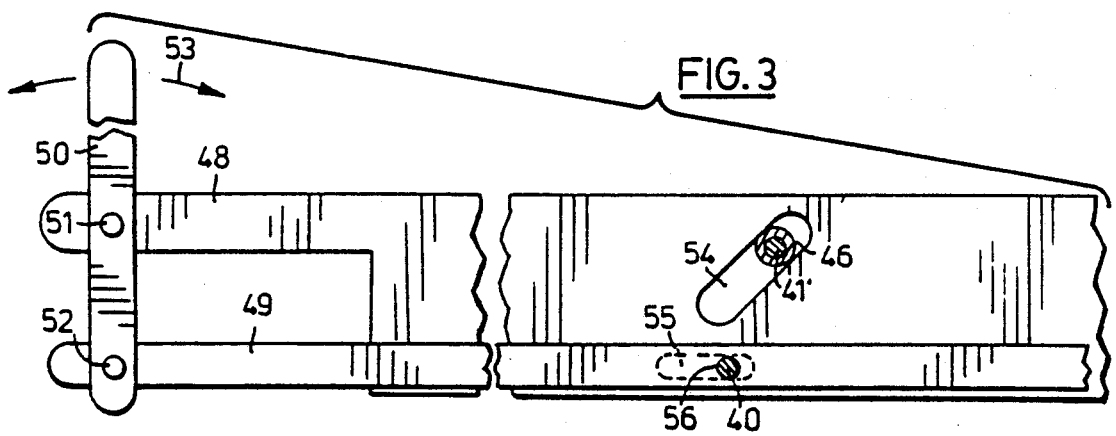
FIG. 3 is a detail of the feed rate adjuster of FIG. 2.
Figure 5:
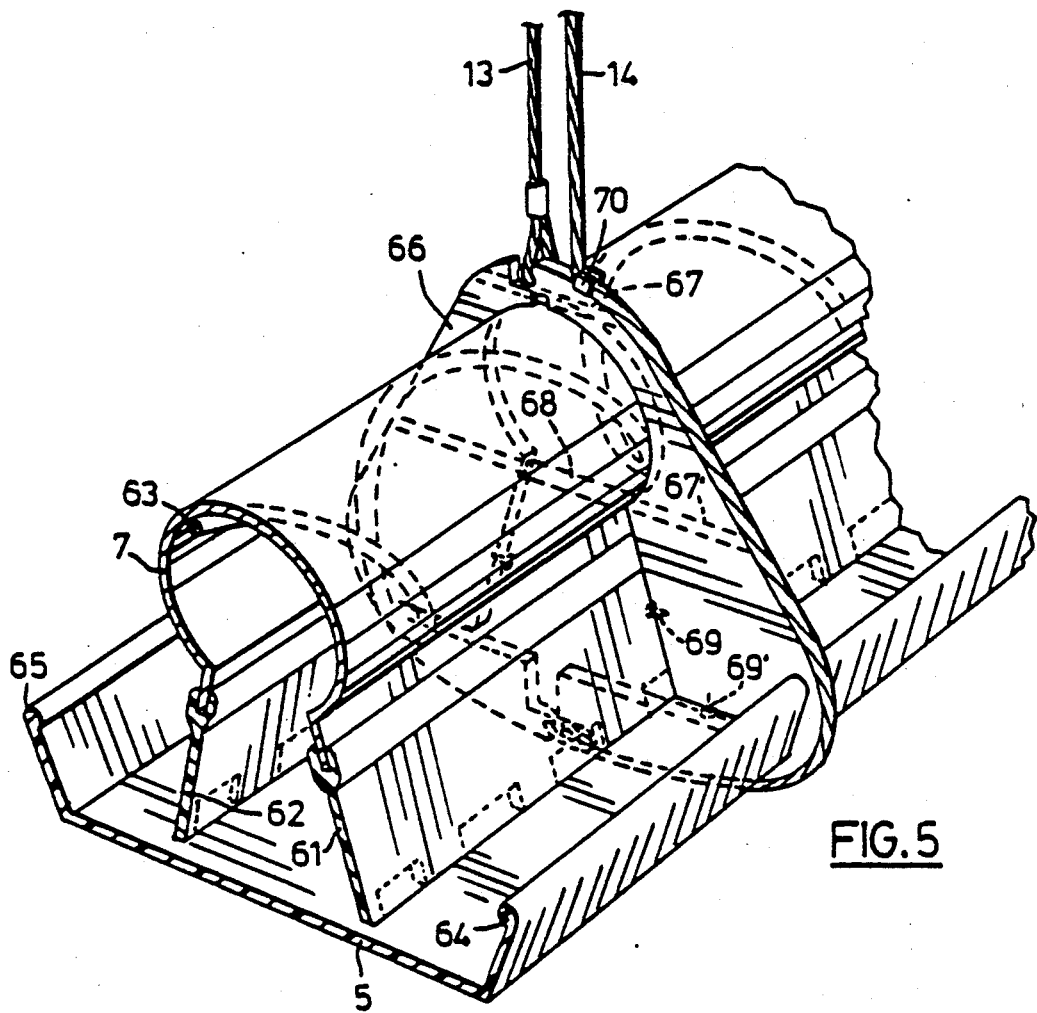
FIG. 5 is an illustration of an alternative trough and support structure.

A further alternative structure is shown in FIG. 5 which omits the feed rate adjuster and variable dimension feed slot but adds certain other features which may or may not be combined with the features of FIGS. 2-4.

In FIG. 5 it will be seen that tube 7 is made of metal as before but the side members 61 and 62 rather than being formed as metal extensions of tube 7 are separate plastic strips which snap onto the edges of the opening in tube 7. The feed auger is a simple corkscrew 63. The trough 5 is moulded from plastic and may be formed by extrusion. The edges are strengthened by incorporating beads 64 and 65.

The clamp 66 is considerably simplified as compared to clamp 10 and consists of two parts made of metal or plastic which clamp around the tube 7 by means of bolts 67 and 67'. As before, a spacer 68 prevents the clamp from crushing tube 7. Suitable fasteners, such as screws 69 and 69' fasten the trough 5 and the side members to the clamp.

As before, cable 13 is fastened to the top of the clamp and cable 14 is fastened to the bottom of the clamp. If will be seen that cable 14 lies in a groove in clamp 66 and is retained there by a spring clip 70. This ensures that there is no slack cable around the trough in which the poultry can become entangled.

OPERATION

The operation is as before except initially the operator snaps all the cables 14 into their grooves where they are releasably retained by the spring clips 70. When inverting the feeder the pull on cable 14 releases them from their spring clips and permits the necessary couple to invert the feeder. After cleaning, the feeder is permitted to resume its normal position and the cables 14 replaced in their spring clips.

The feed slot which permits the feed to flow under the edges of side members 61 and 62 may be fixed by the dimension of clamp 66 relative to the dimensions of the side members 61 and 62 or may be established by extending the side walls 61 and 62 to contact the trough 5 and cutting away portions of the side wall to provide a discontinuous feed slot as shown in dotted line on FIG. 5.

The trough 5, as illustrated, has a flat lower surface, but it may be advantageous to provide a longitudinal ridge down the centre of the trough to urge the feed outwards and through the feed slots.

While no specific dimensions have been provided for the various elements, suitable sizes will be evident to those skilled in the art. Typical dimensions for the trough width would be about 5 inches i.e. wide enough to provide access but too narrow to encourage roosting. The height of the side walls is of some importance since they should not store too much food after the feed is discontinued, but they should be sufficiently high to hide the chickens on opposite sides from each other. A view of a chicken on the opposite side of the feeder can cause distraction and reduce feeding rates.

While the apparatus has been described in various embodiments, it will be understood that the various features may be combined as desired, all within the general principles of my invention.

I claim:

1. An automatic feeder comprising an elongated feed tube including a feed auger, a shallow feed trough supported by said feed tube and extending substantially the entire length of said feed tube, a slot in said tube and a pair of walls, one extending from each of the edges of said slot towards said trough, at least a portion of the edges of said walls spaced a selected distance from said trough, a plurality of identical support structures joining said tube and said trough and adjustably suspended by cables from an overhead support member, said support structures having suspension brackets, a first set of cables connected to said suspension brackets and means to raise said cables.

2. An automatic feeder as claimed in claim 1 wherein said feed auger conveys feed from a feed hopper to the chamber formed between the feed tube said walls and said trough and the rotation of said auger is determined by the quantity of feed in said chamber.

3. An automatic feeder as claimed in claim 2 wherein the selected distance of the said edges of said walls from said trough is adjustable.

4. An automatic feeder as claimed in claim 1 wherein the feed trough is normally maintained in an upright position with the open side of the trough uppermost by virtue of the centre of gravity of the tube and trough assembly lying below said suspension brackets when suspended by said first set of cables and having lower suspension brackets attached to said support structures and a second set of cables connected to said lower suspension brackets to suspend said trough in an inverted position with said open side of said trough facing downwards when suspended by said second set of cables.

5. An automatic feeder as claimed in claim 1 wherein said first and second set of cables are raised by a common winch and said second set of cables may be raised independently with respect to said first set of cables.

6. An automatic feeder comprising an elongated feed tube including a feed auger, a slot extending longitudinally along the lower portion of said feed tube, the edges of said slot having extensions proceeding radially outwards and downwards towards a trough open on its upper side spaced a determined distance from said tube, said extensions having edges adjacent said trough at least a portion of said edges terminating a small distance from said trough to provide gaps between the edges of said extensions and the adjacent surface of said trough, said tube extensions and trough forming a chamber closed except for said gaps and the opening of said feed tube into a feed hopper and means to rotate said auger to move feed between said hopper and said chamber.

7. An automatic feeder as claimed in claim 6 wherein said means to rotate said auger is an electric motor.

8. An automatic feeder as claimed in claim 7 where said electric motor is energized in accordance with the quantity of feed in said chamber.

9. An automatic feeder as claimed in claim 8 wherein said trough is supported on said feed tube by means of support brackets and said support brackets are suspended by adjustable first cables from overhead suspending means.

10. An automatic feeder as claimed in claim 9 including a manual over-ride control to prevent actuation of said electric motor and second cables connected to lower portions of said support brackets below said trough whereby when said support brackets are suspended by said second cables said support brackets, tube and trough are inverted with the open side of the trough facing downwards.

* * * * *